(12) United States Patent
Shao et al.

(10) Patent No.: US 12,437,351 B2
(45) Date of Patent: Oct. 7, 2025

(54) METHOD FOR GAS PIPELINE NETWORK SUPERVISION BASED ON SMART GAS AND INTERNET OF THINGS SYSTEM THEREOF

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Bin Liu, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/676,475

(22) Filed: May 28, 2024

(65) Prior Publication Data

US 2024/0311846 A1    Sep. 19, 2024

Related U.S. Application Data

(63) Continuation of application No. 18/302,771, filed on Apr. 18, 2023, now Pat. No. 12,045,837.

(30) Foreign Application Priority Data

Feb. 13, 2023  (CN) .......................... 202310102872.8

(51) Int. Cl.
*G06Q 50/06* (2024.01)
*F17D 5/00* (2006.01)
(Continued)

(52) U.S. Cl.
CPC .............. *G06Q 50/06* (2013.01); *F17D 5/005* (2013.01); *G06Q 10/06375* (2013.01); *G06Q 30/018* (2013.01)

(58) Field of Classification Search
CPC .......... G06Q 30/018; G06Q 10/06375; G06Q 50/06; F17D 5/005
See application file for complete search history.

(56) References Cited

U.S. PATENT DOCUMENTS

2015/0100368 A1    4/2015  Blomberg et al.
2017/0185902 A1    6/2017  Kumar et al.
(Continued)

FOREIGN PATENT DOCUMENTS

CN    102880987 A    1/2013
CN    106529696 A    3/2017
(Continued)

OTHER PUBLICATIONS

Liang, et al., A Data Driven Approach for Leak Detection with Smart Sensors, 16th International Conference on Control, Automation, Robotics and Vision (ICARCV), pp. 1311-1316 (2020) (Year: 2020).*

(Continued)

*Primary Examiner* — Charles Guiliano
(74) *Attorney, Agent, or Firm* — METIS IP LLC

(57) ABSTRACT

The embodiment of the present disclosure provides a method for gas pipeline network supervision based on smart gas and an Internet of Things system, the method including: obtaining an area to be inspected; determining one or more downstream users based on the area to be inspected, obtaining gas consumption data of each of the one or more downstream users; determining, based on the gas consumption data, peak-valley features of gas consumption at a future time; determining a plurality of optional time points based on the peak-valley features of gas consumption; predicting future gas consumption features based on one or more change values of accessibility, the plurality of optional time points, and the gas consumption data through a prediction model; determining a target inspection time point based on (Continued)

the future gas consumption features; and generating inspection reminder instructions based on the target inspection time point.

9 Claims, 8 Drawing Sheets

(51) Int. Cl.
  *G06Q 10/0637* (2023.01)
  *G06Q 30/018* (2023.01)

(56) References Cited

U.S. PATENT DOCUMENTS

| | | | | |
|---|---|---|---|---|
| 2018/0300639 | A1* | 10/2018 | Abbas | G06N 20/00 |
| 2020/0250994 | A1* | 8/2020 | Gorsica | G08G 5/57 |
| 2021/0216852 | A1* | 7/2021 | Reece | G08B 29/20 |
| 2022/0163958 | A1 | 5/2022 | Shao et al. | |
| 2022/0214203 | A1 | 7/2022 | Shao et al. | |

FOREIGN PATENT DOCUMENTS

| | | |
|---|---|---|
| CN | 109324552 A | 2/2019 |
| CN | 110233796 A | 9/2019 |
| CN | 111282717 A | 6/2020 |
| CN | 111651648 A | 9/2020 |
| CN | 111835582 A | 10/2020 |
| CN | 112288132 A | 1/2021 |
| CN | 114254832 A | 3/2022 |
| CN | 114912635 A | 8/2022 |
| CN | 115545231 A | 12/2022 |
| EP | 3789838 A1 | 3/2021 |
| IN | 201741039310 A | 5/2019 |
| JP | 2017153257 A | 8/2017 |
| JP | 2018116700 A | 7/2018 |

OTHER PUBLICATIONS

Reddy, et al., Leak Detection in Gas Pipeline Networks Using an Efficient State Estimator. Part-I: Theory and Simulations, 35 Computers and Chemical Engineering 4, pp. 651-661 (2011) (Year: 2011).*

Liang, Bin et al., A Data Driven Approach for Leak Detection with Smart Sensors, 16th International Conference on Control, Automation, Robotics and Vision (ICARCV), 1311-1316, 2020.

Reddy, H. Prashanth et al., Leak Detection in Gas Pipeline Networks Using an Efficient State Estimator. Part—I: Theory and Simulations, Computers and Chemical Engineering, 35(4): 651-661, 2011.

Liu, Zhen et al., Research on Optimization Model and Application of Power Distribution Network Mainte-nance Plan, Journal of Chongqing University of Technology(Natural Science), 34(2): 196-202, 2020.

Guan, Hongpeng et al., Pipeline Network Simulation Technology to Improve Gas Safety Management Level, Urban Management and Technology, 2013, 5 pages.

Li, Xue et al., Study on Peak Load Shifting of Power Scheme Based on Load Characteristics, Electrical Appliances and Energy Efficiency Management Technology, 54-57&70, 2016.

Yang, Jiali et al., Comprehensive Evaluation Method of Voltage Sag Severity Based on Entropy Coefficient Method, Modern Electric Power, 34(4): 40-49, 2017.

Wang, Shouwen et al., Comprehensive Benefit Evaluation Model of TOU Price Scheme for Electric Vehicles, Price Theory and Practice, 2017, 4 pages.

Notification to Grant Patent Right for Invention in Chinese Application No. 202310102872.8 mailed on Apr. 11, 2023, 2 pages.

First Office Action in Chinese Application No. 202310102872.8 mailed on Mar. 18, 2023, 25 pages.

* cited by examiner

METHOD FOR GAS PIPELINE NETWORK SUPERVISION BASED ON SMART GAS AND INTERNET OF THINGS SYSTEM THEREOF

CROSS-REFERENCE TO RELATED APPLICATIONS

This application is a continuation of U.S. application Ser. No. 18/302,771, filed on Apr. 18, 2023, which claims priority to Chinese Patent Application No. 202310102872.8, filed on Feb. 13, 2023, the entire contents of each of which are incorporated herein by reference.

TECHNICAL FIELD

The present disclosure relates to the field of gas pipeline network inspection, and in particular to a method for gas pipeline network supervision based on smart gas and an Internet of Things system.

BACKGROUND

In order to ensure a safe operation of a gas pipeline network, the gas pipeline network needs to be inspected during a usage of the gas pipeline network. For example, the gas pipeline network needs to be inspected whether there is a gas leakage, a gas odor, a gas device damage, etc., in the gas pipeline network.

Gas users in different areas have different gas consumption features. For example, industrial areas correspond to gas industrial users, and residential areas correspond to ordinary gas users. However, the inspection may have a certain impact on the gas consumption of the users. How to determine a reasonable gas inspection plan according to the gas consumption features of the users is an urgent problem to be solved in the field of gas pipeline network inspection.

SUMMARY

One or more embodiments of the present disclosure provide a method for gas pipeline network supervision based on smart gas. The method is implemented based on a smart gas pipeline network safety management platform of an Internet of Things (IoT) system for gas pipeline network supervision based on smart gas. The IoT system further includes a smart gas user platform, a smart gas service platform, a smart gas sensor network platform, and a smart gas object platform, wherein the smart gas pipeline network safety management platform includes a smart gas pipeline network inspection management sub-platform and a smart gas data center, the smart gas sensor network platform includes a smart gas pipeline network inspection project sensor network sub-platform, the smart gas object platform includes one or more smart gas pipeline network inspection project object sub-platforms. The method includes: obtaining an area to be inspected through the smart gas data center; determining one or more downstream users based on the area to be inspected, and obtaining gas consumption data of each of the one or more downstream users through the smart gas sensor network platform; determining, based on the gas consumption data of the one or more downstream users, peak-valley features of gas consumption at a future time; determining a plurality of optional time points based on the peak-valley features of gas consumption; predicting future gas consumption features based on one or more change values of accessibility, the plurality of optional time points, and the gas consumption data of the one or more downstream users through a prediction model, wherein: the future gas consumption features are gas consumption features after inspection based on each of the plurality of optional time points; and the accessibility is used to represent whether a gas source node is capable of normally supplying gas to a user node; the prediction model is a machine learning model, wherein the prediction model is obtained by a training process based on a plurality of training samples with labels, the training process including: inputting the plurality of the training samples into an initial prediction model; constructing a loss function based on the labels and results of the initial prediction model; updating parameters of the initial prediction model iteratively based on the loss function; and obtaining a trained prediction model when a preset training condition of the initial prediction model is satisfied, wherein the preset training condition includes that the loss function converges or a count of iterations reaches a threshold; and the training samples including historical gas consumption data of the each of the one or more downstream users before a plurality of historical inspection time points; and the labels being historical gas consumption features after inspection based on the plurality of historical inspection time points; determining a target inspection time point based on the future gas consumption features; and generating inspection reminder instructions based on the target inspection time point through an inspection time warning module of the smart gas pipeline network inspection management sub-platform, wherein the inspection reminder instructions are sent to a corresponding smart gas pipeline network inspection project object sub-platform by the smart gas data center through the smart gas pipeline network inspection project sensor network sub-platform of the smart gas sensor network platform.

One or more embodiments of the present disclosure provide an Internet of Things system for gas pipeline network supervision based on smart gas. The system includes a smart gas user platform, a smart gas service platform, a smart gas pipeline network safety management platform, a smart gas sensor network platform, and a smart gas object platform. The smart gas pipeline network safety management platform includes a smart gas pipeline network inspection management sub-platform and a smart gas data center, the smart gas sensor network platform includes a smart gas pipeline network inspection project sensor network sub-platform, the smart gas object platform includes one or more smart gas pipeline network inspection project object sub-platforms. The smart gas pipeline network safety management platform is configured to perform operations including: obtaining an area to be inspected through the smart gas data center; determining one or more downstream users based on the area to be inspected, and obtaining gas consumption data of each of the one or more downstream users through the smart gas sensor network platform; determining, based on the gas consumption data of the one or more downstream users, peak-valley features of gas consumption at a future time; determining a plurality of optional time points based on the peak-valley features of gas consumption; predicting future gas consumption features based on one or more change values of accessibility, the plurality of optional time points, and the gas consumption data of the one or more downstream users through a prediction model, wherein: the future gas consumption features are gas consumption features after inspection based on each of the plurality of optional time points; and the accessibility is used to represent whether a gas source node is capable of normally supplying gas to a user node; the prediction model is a machine learning model, wherein the prediction model is obtained by a training process based on a plurality of training samples with labels, the training process including: inputting the plurality of the training samples into an initial prediction model; constructing a loss function based on the labels and results of the initial prediction model; updating parameters of the initial prediction model iteratively based on the loss function; and obtaining a trained prediction model when a preset training condition of the initial prediction model is satisfied, wherein the preset training condition includes that the loss function converges or a count of iterations reaches a threshold; and the training samples including historical gas consumption data of the each of the one or more downstream users before a plurality of historical inspection time points; and the labels being historical gas consumption features after inspection based on the plurality of historical inspection time points; determining a target inspection time point based on the future gas consumption features; and generating inspection reminder instructions based on the target inspection time point through an inspection time warning module of the smart gas pipeline network inspection management sub-platform, wherein the inspection reminder instructions are sent to a corresponding smart gas pipeline network inspection project object sub-platform by the smart gas data center through the smart gas pipeline network inspection project sensor network sub-platform of the smart gas sensor network platform.

One or more embodiments of the present disclosure provide a non-transitory computer-readable storage medium storing computer instructions. After reading the computer instructions in the storage medium, a computer executes the method for gas pipeline network supervision based on smart gas.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
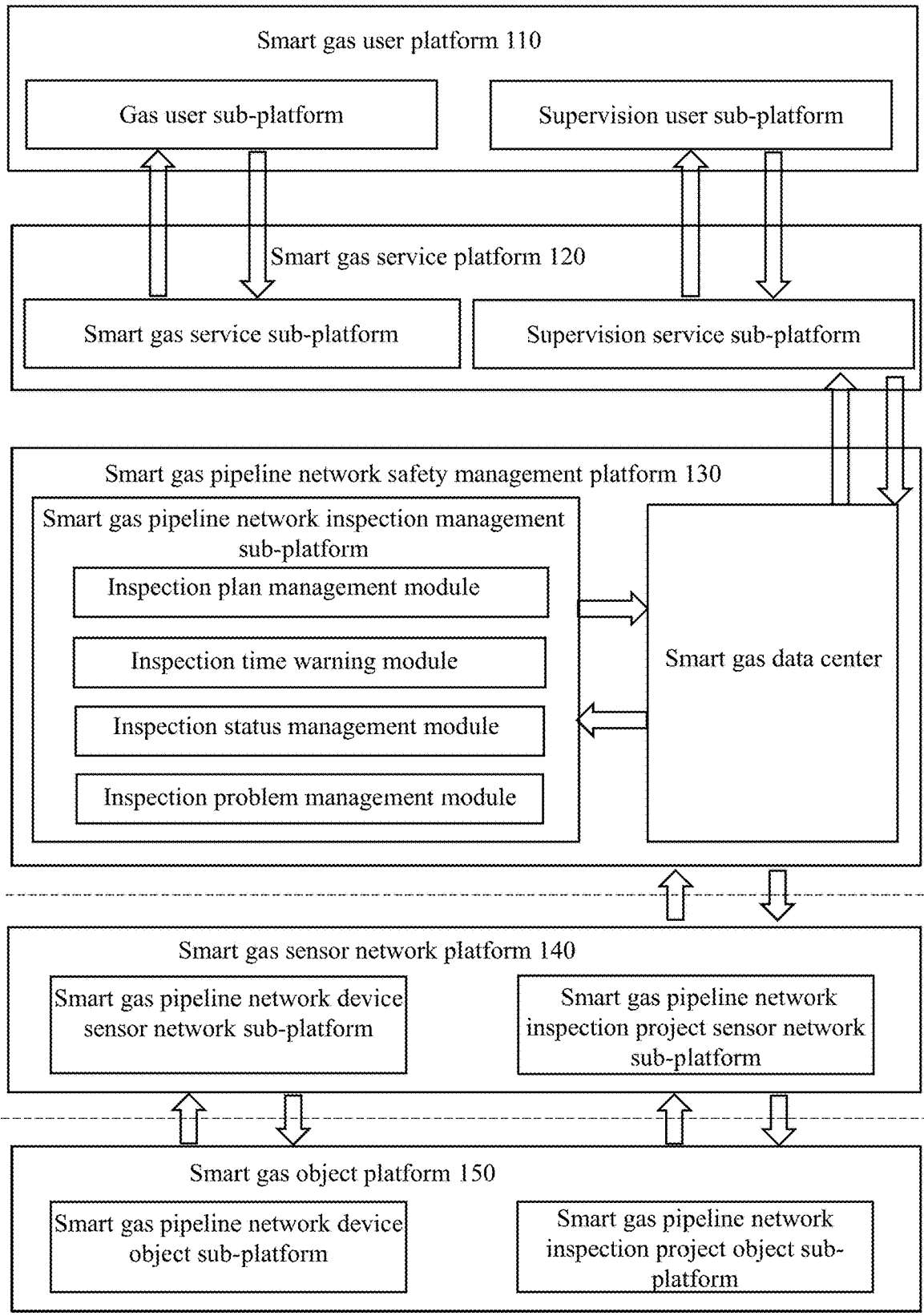
FIG. 1 is a diagram of an Internet of Things system for determining a smart gas inspection plan according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a diagram of an Internet of Things system for determining a smart gas inspection plan according to some embodiments of the present disclosure.

In some embodiments, the Internet of Things system 100 for determining a smart gas inspection plan may include a smart gas user platform 110, a smart gas service platform 120, a smart gas pipeline network safety management platform 130, a smart gas sensor network platform 140, and a smart gas object platform 150.

The smart gas user platform 110 refers to a platform that is user-oriented and capable of interacting with a user. The user may be, for example, a gas user, a supervision user, or the like. In some embodiments, the smart gas user platform 110 may be configured as a terminal device. For example, the terminal device may include a mobile device, a tablet computer, or the like, or any combination thereof. In some embodiments, the smart gas user platform 110 may feed information back to the user through the terminal device. For example, the smart gas user platform 110 may feed gas pipeline network inspection management information back to the user through the terminal device (for example, a display, etc.).

In some embodiments, the smart gas user platform 110 may include a gas user sub-platform. The gas user sub-platform is aimed at a gas user. The gas user may refer to a user who actually use gas, such as a consumer.

In some embodiments, the gas user sub-platform may perform data interaction with a smart gas service sub-platform of the smart gas service platform 120. For example, the gas user sub-platform may receive the gas pipeline network inspection management information uploaded by the smart gas service sub-platform of the smart gas service platform 120. The gas pipeline network inspection management information refers to information related to gas pipeline network inspection, such as an area to be inspected, an inspection time, an inspection plan, etc. For more information about the area to be inspected, the inspection time, and the inspection plan, please refer to relevant descriptions in FIG. 2. The gas user may obtain the gas pipeline network inspection management information through the gas user sub-platform.

In some embodiments, the smart gas user platform 110 may include a supervision user sub-platform. The supervision user sub-platform is aimed at a supervision user and may supervise an operation of the entire Internet of Things system 100 for determining the smart gas inspection plan. The supervision user may refer to a user of a gas safety supervision department. The supervision user may obtain the gas pipeline network inspection management information through the gas user sub-platform, and may also obtain pipeline network maintenance and inspection strategies, etc.

The smart gas service platform 120 may be a platform for receiving and transmitting data and/or information. The smart gas service platform 120 may perform data interaction with the smart gas user platform 110 and the smart gas pipeline network safety management platform 130. In some embodiments, the smart gas service platform 120 may upload the gas pipeline network inspection management information to the smart gas user platform 110.

In some embodiments, the smart gas service platform 120 may include a smart gas service sub-platform. The smart gas service sub-platform may exchange data with the gas user sub-platform to provide gas users with the gas pipeline network inspection management information.

In some embodiments, the smart gas service platform 120 may include a smart gas service sub-platform and a smart supervision service sub-platform. The smart gas service platform 120 may perform data interaction with the supervision user sub-platform, and provide the supervision user with the gas pipeline network inspection management information.

The smart gas pipeline network safety management platform 130 may refer to a platform for coordinating the connection and collaboration between various functional platforms. In some embodiments, the smart gas pipeline network safety management platform 130 may receive the gas consumption data uploaded by the smart gas sensor network platform 140, analyze and process it, and upload processed data to the smart gas user platform 110. For example, the smart gas pipeline network safety management platform 130 may obtain the area to be inspected, determine downstream users based on the area to be inspected, and obtain the gas consumption data of the downstream users. The smart gas pipeline network safety management platform 130 may also determine the peak-valley features of gas consumption at the future time based on the gas consumption data of the downstream users, determine the inspection time of the area to be inspected based on the peak-valley features of gas consumption at the future time, and determine the inspection plan of the area to be inspected based on the inspection time of the area to be inspected.

In some embodiments, the smart gas pipeline network safety management platform 130 may include a smart gas pipeline network inspection management sub-platform and a smart gas data center.

In some embodiments, the smart gas pipeline network safety management platform 130 may exchange information with the smart gas service platform 120 and the smart gas sensor network platform 140 through the smart gas data center.

In some embodiments, the smart gas pipeline network safety management platform 130 is configured to perform the following operations: obtaining an area to be inspected; determining one or more downstream users based on the area to be inspected, and obtaining gas consumption data of each of the one or more downstream users; determining, based on the gas consumption data of the each of the one or more downstream users, peak-valley features of gas consumption at the future time; and determining, based on the peak-valley features of gas consumption at the future time, an inspection time of the area to be inspected.

The smart gas pipeline network inspection management sub-platform refers to a platform used to obtain data from the smart gas data center and feed the corresponding data related to the gas pipeline network inspection management back. For example, the smart gas pipeline network inspection management sub-platform may send the processed pipeline network inspection management information (for example, the area to be inspected, the inspection time, the inspection plan, etc.) to the smart gas data center. In some embodiments, the smart gas pipeline network inspection management sub-platform may include one or more of an inspection plan management module, an inspection time warning module, an inspection status management module, and an inspection problem management module.

The inspection plan management module refers to a module configured to set and adjust the inspection plan of a pipeline network device. The inspection plan management module may send the inspection plan to a smart gas pipeline network inspection project sensor network sub-platform, which may affect sending the gas consumption inspection plan of the user to the user platform.

The inspection time warning module refers to a module configured for early warning of an unexecuted inspection plan. The inspection time warning module may automatically arrange the unexecuted inspection plan according to the inspection time, and give a prompt and alarm according to a preset threshold. Managers may directly generate inspection reminder instructions through the inspection time warning module, and the smart gas data center may send the inspection reminder commands to a corresponding smart gas pipeline network inspection project object sub-platform through a smart gas pipeline network inspection project sensor network sub-platform.

The inspection status management module refers to a module configured to check a historical inspection execution status and inspection plan of the pipeline network device.

The inspection problem management module refers to a module configured to view, remotely process inspection problems, and send messages.

The smart gas data center may summarize and store all operating data of the Internet of Things system 100 for determining the smart gas inspection plan. The smart gas pipeline network inspection management sub-platform may interact with the smart gas data center in two directions. In some embodiments, the smart gas data center may receive the data uploaded by the smart gas pipeline network sensor network platform, and send it to the smart gas pipeline network inspection management sub-platform for analysis and processing. For example, the smart gas data center may send the pipeline network inspection management information to the smart gas pipeline network inspection management sub-platform for analysis and processing, and the smart gas pipeline network inspection management sub-platform may send the processed pipeline network inspection management information to the smart gas data center.

The smart gas sensor network platform 140 may be a functional platform for managing sensor communication. In some embodiments, the smart gas sensor network platform 140 may be configured as a communication network and gateway.

In some embodiments, the smart gas sensor network platform 140 may perform data interaction with the smart gas pipeline network safety management platform 130 and the smart gas object platform 150 to realize functions of perception information sensor communication and control information sensor communication. For example, the smart gas sensor network platform 140 may receive the pipeline network inspection management information uploaded by the smart gas object platform 150, or issue an instruction of obtaining the pipeline network inspection management information to the smart gas object platform 150. As another example, the smart gas sensor network platform 140 may receive the instruction of obtaining the pipeline network inspection management information issued by the smart gas data center, and upload the pipeline network inspection management information to the smart gas data center.

In some embodiments, the smart gas sensor network platform 140 may include a smart gas pipeline network device sensor network sub-platform. The smart gas pipeline network device sensor network sub-platform may correspond to a smart gas pipeline network device object sub-platform, and may be used to obtain related data of the pipeline network device. The smart gas pipeline network device sensor network sub-platform may perform data interaction with the smart gas object platform 150. For example, the smart gas pipeline network device sensor network sub-platform may receive the pipeline network inspection management information uploaded by the smart gas object platform 150 or issue the instruction of obtaining the pipeline network inspection management information to the smart gas object platform 150. In some embodiments, the smart gas sensor network platform 140 may include a plurality of smart gas pipeline network device sensor network sub-platforms for monitoring different pipeline network areas.

In some embodiments, the smart gas sensor network platform 140 may include a smart gas pipeline network inspection project sensor network sub-platform. The smart gas pipeline network inspection project sensor network sub-platform corresponds to the smart gas pipeline network inspection project object sub-platform, and may be used to send inspection reminder instructions to the smart gas pipeline network inspection project object sub-platform. The smart gas pipeline network inspection project sensor network sub-platform may perform data interaction with the smart gas object platform 150. For example, the smart gas pipeline network inspection project sensor network sub-platform may receive the pipeline network inspection management information uploaded by the smart gas object platform 150, and issue the inspection reminder instructions to the smart gas pipeline network inspection project object sub-platform.

The smart gas object platform 150 may refer to a functional platform for obtaining the perception information. In some embodiments, the smart gas object platform 150 may be configured to include at least one device. For example, the smart gas object platform 150 may include a gas device and an inspection project device. The gas device may include a pipeline network device, and the pipeline network device includes pipelines, gate stations, etc. The inspection project device may include inspection vehicles, alarm devices, etc. The gas device or inspection project device may be configured with a unique identifier, which may be used in the smart gas pipeline network safety management platform 130 to control the gas device or inspection project device deployed in different areas of the pipeline network. In some embodiments, the smart gas object platform 150 may perform data interaction with the smart gas sensor network platform 140, and upload the obtained pipeline network inspection management information to the smart gas sensor network platform 140.

In some embodiments, the smart gas object platform 150 may include a smart gas pipeline network device object sub-platform. The smart gas pipeline network device object sub-platform corresponds to the smart gas pipeline network device sensor network sub-platform. The smart gas pipeline network device object sub-platform may upload the related information of the pipeline network device to the smart gas pipeline network device sensor network sub-platform. The smart gas pipeline network device object sub-platform may perform data interaction with the smart gas sensor network platform 140. For example, the smart gas pipeline network device object sub-platform may upload the related information of the pipeline network device to the smart gas pipeline network device sensor network sub-platform, or receive the instruction of obtaining the related information of the pipeline network device issued by the smart gas pipeline network device sensor network sub-platform. In some embodiments, the smart gas object platform 150 may include a plurality of smart gas pipeline network device object sub-platforms for monitoring or controlling different pipeline network areas.

In some embodiments, the smart gas object platform 150 may include a smart gas pipeline network inspection project object sub-platform. The smart gas pipeline network inspection project object sub-platform corresponds to the smart gas pipeline network inspection project sensor network sub-platform. The smart gas pipeline network inspection project object sub-platform may receive the instruction of obtaining the pipeline network inspection management information issued by the smart gas pipeline network inspection project sensor network sub-platform. The smart gas pipeline network inspection project object sub-platform may exchange data with the smart gas pipeline network inspection project sensor network sub-platform. For example, the smart gas pipeline network inspection project object sub-platform may receive instructions/feedback for obtaining inspection reminders, instructions for obtaining inspection problems, etc., issued by the smart gas pipeline network inspection project sensor network sub-platform.

In some embodiments of the present disclosure, through building the Internet of Things system for determining the smart gas inspection plan including the smart gas user platform, smart gas service platform, smart gas network safety management platform, smart gas sensor network platform, and smart gas object platform, a closed loop of smart gas network inspection management information operation is formed among the network pipeline device, gas operators, gas users, and supervision users, thereby realizing informatization and intelligence of the pipeline network inspection management, ensuring a high-quality management effect, and reducing an impact on gas consumption of downstream users during the inspection.

It should be noted that the above descriptions of the Internet of Things system for determining the gas inspection plan and the platforms thereof are only for convenience of description, and does not limit the present disclosure to the scope of the embodiments cited. It may be understood that after understanding the principle of the system, those skilled in the art may arbitrarily combine each module or form a sub-system to connect with other modules without departing from this principle. In some embodiments, the smart gas sensor network platform and the smart gas object platform disclosed in FIG. 1 may be different platforms in one system, or may be a platform realizing the functions of the above-mentioned two or more platforms. For example, each platform may share one storage module, or each platform may have its own storage module. Such deformations are within the protection scope of the present disclosure.

Figure 2:
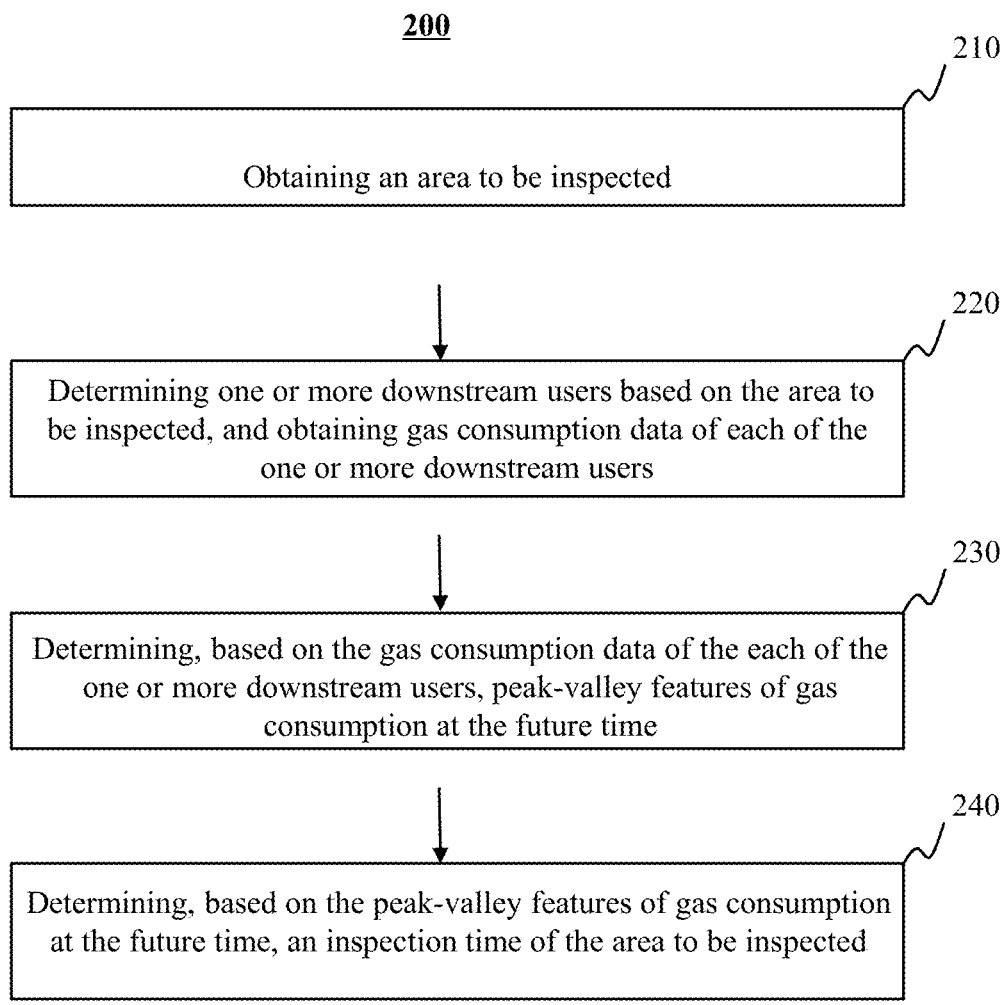
FIG. 2 is a flowchart illustrating an exemplary process for determining a gas inspection plan according to some embodiments of the present disclosure.

FIG. 2 is a flowchart illustrating an exemplary process for determining a gas inspection plan according to some embodiments of the present disclosure. In some embodiments, process 200 may be executed by the Internet of Things system for determining the smart gas inspection plan. As shown in FIG. 2, process 200 includes the following steps.

Step 210, obtaining an area to be inspected.

The area to be inspected refers to an area where the gas inspection is required. For example, the area to be inspected may be district A of a city. As another example, the area to be inspected may be a residential community.

In some embodiments, the area to be inspected may be obtained in various ways. For example, the area to be inspected may be determined based on the allocation of urban divisions.

Step 220, determining one or more downstream users based on the area to be inspected, and obtaining gas consumption data of each of the one or more downstream users.

The downstream users refer to downstream areas whose gas consumption may be affected during the gas inspection. For example, the downstream users may be downstream residential communities whose gas consumption may be affected during the gas inspection.

In some embodiments, the downstream users may be determined in various ways. For example, the downstream users may be determined based on the gas transmission and distribution information of the gas gate station. The gas gate station refers to a transfer station for receiving, managing, and distributing gas.

The gas consumption data refers to data related to the gas consumption of downstream users. For example, the gas consumption data may include a gas consumption amount of the downstream user in a historical time period, a gas consumption velocity of the downstream user at a historical time, or the like.

In some embodiments, the gas consumption data may be obtained in various ways. For example, the gas consumption data may be obtained based on the historical gas statistical data of the gas gate station.

Step 230, determining, based on the gas consumption data of the each of the one or more downstream users, peak-valley features of gas consumption at the future time.

The peak-valley features of gas consumption refer to a time point and a gas consumption velocity when a change rate of gas consumption velocity is 0. The change rate of the gas consumption velocity may be obtained by deriving the gas consumption velocity, and the point at which the change rate of the gas consumption velocity is 0 corresponds to the peak or valley of the gas consumption velocity (hereinafter referred to as the peak point or valley point). For example, the peak-valley features of gas consumption may be that at 9:00 on Nov. 11, 2022, the change rate of the gas consumption velocity is 0, and the gas consumption velocity at this time is v.

In some embodiments, the smart gas pipeline network safety management platform may determine the peak-valley features of gas consumption at the future time in various ways. For example, the smart gas pipeline network safety management platform may use the historical peak-valley features of gas consumption at the time corresponding to the future time period in the past year as the peak-valley features of gas consumption at the future time. As another example, the smart gas pipeline network safety management platform may determine the peak-valley features of gas consumption at the future time through a prediction model. For more information on determining the peak-valley features at the future time through the prediction model, please refer to FIG. 4 and related descriptions thereof.

Step 240, determining, based on the peak-valley features of gas consumption at the future time, an inspection time of the area to be inspected.

The inspection time refers to a time period during which gas-related device needs to be inspected. For example, the inspection time may be from 9:00 to 11:00 on Nov. 11, 2022.

In some embodiments, the smart gas pipeline network safety management platform may determine the inspection time of the area to be inspected in various ways. For example, the smart gas pipeline network safety management platform may use the time corresponding to a point with the lowest gas consumption velocity in the future as the inspection time. As another example, the smart gas pipeline network safety management platform may determine a plurality of optional time points based on the peak-valley features of gas consumption; determine a target inspection time point based on the plurality of optional time points; and determine the target inspection time point as a next inspection time. For more details about determining the target inspection time point as the next inspection time, please refer to FIG. 6 and related descriptions thereof.

In some embodiments of the present disclosure, the peak-valley features of gas consumption in the future are predicted by the gas consumption data of the downstream user to determine the inspection time of the inspection area, so that the inspection personnel can work in an inspection time with a low gas consumption velocity, which can minimize the influence of the inspection on the gas consumption of downstream users.

Figure 3:
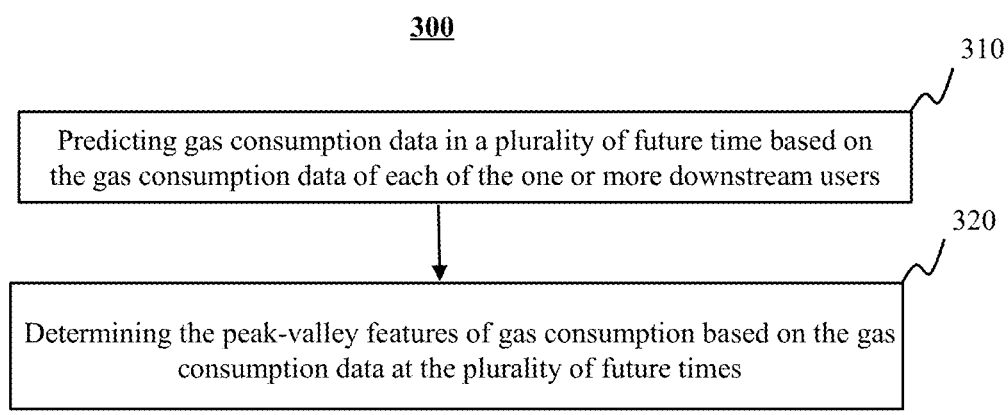
FIG. 3 is a flowchart illustrating an exemplary process for determining peak-valley features of gas consumption at a future time according to some embodiments of the present disclosure.

FIG. 3 is a flowchart illustrating an exemplary process for determining peak-valley features of gas consumption at a future time according to some embodiments of the present disclosure. As shown in FIG. 3, process 300 includes the following steps. In some embodiments, process 300 may be executed by the smart gas pipeline network safety management platform 130.

Step 310, predicting gas consumption data in a plurality of future time based on the gas consumption data of each of the one or more downstream users.

In some embodiments, the gas consumption data at the plurality of future times may be predicted in various ways. For example, the gas consumption data of each of the plurality of downstream users may be fitted to obtain a time-gas consumption data relationship curve, and the gas consumption data at the plurality of future times may be predicted based on the relationship curve. As another example, the prediction model 420 may be used to predict gas consumption data at the plurality of future times. For more details about the prediction model 420, refer to the relevant descriptions in FIG. 4.

Step 320, determining the peak-valley features of gas consumption based on the gas consumption data at the plurality of future times.

In some embodiments, the peak-valley features of gas consumption may be determined in various ways. For example, a time-gas consumption velocity relationship curve (such as the curves shown in FIG. 7 and FIG. 8) may be established based on the gas consumption data in a plurality of historical times, and the peak-valley features of gas consumption may be determined by mathematical methods, such as curve fitting and derivation. As another example, a gas transmission and distribution pipeline network graph 500 may be constructed, and the peak-valley features of gas consumption may be determined based on the gas transmission and distribution pipeline network graph 500. For more information about the gas transmission and distribution network graph 500, please refer to the relevant descriptions in FIG. 5.

Figure 4:
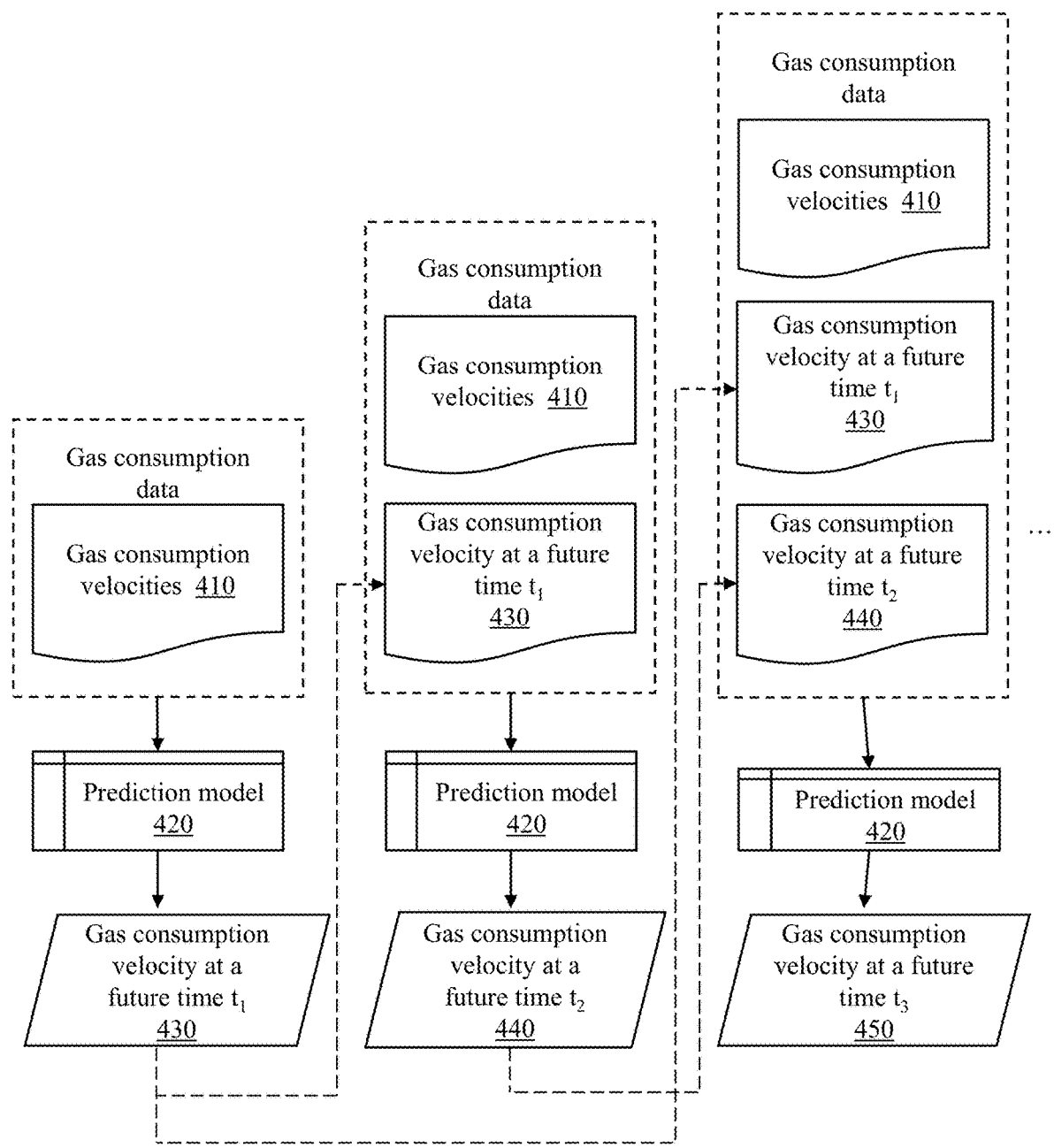
FIG. 4 is a schematic diagram illustrating an exemplary process for predicting gas consumption data at a plurality of future times according to some embodiments of the present disclosure.

FIG. 4 is a schematic diagram illustrating an exemplary process for predicting gas consumption data at a plurality of future times according to some embodiments of the present disclosure.

In some embodiments, the smart gas pipeline network safety management platform 130 may independently predict the gas consumption data at the plurality of future times of each of the one or more downstream users based on the gas consumption data of each of the one or more downstream users. For example, the smart gas pipeline network safety management platform 130 may independently predict gas consumption data at the plurality of future times based on algorithms or models.

In some embodiments, the smart gas pipeline network safety management platform 130 may independently predict gas consumption data at the plurality of future times based on the prediction model 420.

The prediction model 420 may refer to a model used to predict gas consumption data at the future time. The prediction model 420 may be a trained machine learning model. The prediction model 420 may include other models, for example, any one or a combination of a recurrent neural network model, a convolutional neural network, or other self-defined model structures.

In some embodiments, the gas consumption data of each of the one or more downstream users may include gas consumption velocities 410 at the plurality of historical times, and the gas consumption data at the plurality of future times may include gas consumption velocities at the plurality of future times, for example, the gas consumption velocity 430 at a future time $t_1$, the gas consumption velocity 440 at a future time $t_2$, the gas consumption velocity 450 at a future time $t_3$ . . . . The smart gas pipeline network safety management platform 130 may respectively input different gas consumption velocities into the prediction model 420, and sequentially output different gas consumption velocities at the future time based on the processing of the prediction model 420. For example, the gas consumption velocities 410 at the plurality of historical times may be input into the prediction model 420 to obtain the gas consumption velocity 430 at the future time $t_1$. The gas consumption velocity 410 at the plurality of historical times and the gas consumption velocity at the future time t 430 may be input into the prediction model 420 to obtain the gas consumption velocity at the future time $t_2$ 440. The gas consumption velocity 410 at the plurality of historical times, the gas consumption velocity at the future time $t_1$ 430, and the gas consumption velocity at the future time $t_2$ 440 may be input into the prediction model 420 to obtain the gas consumption velocity at the future time $t_3$ 450, etc.

The prediction model 420 may be trained based on a large number of first training samples with first labels. For example, a plurality of first training samples with the first labels may be input into the initial prediction model, a loss function may be constructed based on the first labels and the results of the initial prediction model, and the parameters of the initial prediction model may be iteratively updated by gradient descent or other methods based on the loss function. When a preset condition is satisfied, the model training is completed, and the trained prediction model 420 is obtained. The preset conditions may be that the loss function converges, the number of iterations reaches a threshold, etc.

In some embodiments, the first training samples used to train the prediction model 420 may include gas consumption velocities 410 in the plurality of historical times. The first training samples may be obtained based on historical data. The first label may be the actual gas consumption velocities corresponding to the gas consumption velocities 410 in the plurality of historical times. The first label may be marked manually. For example, an error between the predicted gas consumption velocity and the actual gas consumption velocity may be calculated, and the first training sample whose error is smaller than a preset threshold (for example, 1%, 0.1%, etc.) is marked as 1, and the rest are 0.

In some embodiments, the smart gas network safety management platform 130 may independently determine a plurality of peak-valley sub-features of gas consumption of the each downstream user at the future time based on the gas consumption data at the plurality of future times of the each of the one or more downstream users, and determine the peak-valley features of gas consumption based on the plurality of peak-valley sub-features of gas consumption. The peak-valley features of gas consumption of each downstream user at the future time may include a plurality of peak-valley features of gas consumption of the user at the future time. For more information on determining the peak-valley features, please refer to the related descriptions in FIG. 5.

In some embodiments, the process for determining the peak-valley features of gas consumption based on the plurality of peak-valley sub-features of gas consumption includes a weighted calculation manner, and a weight of the weighted calculation manner may be determined based on an inspection influence degree, and a process for determining the inspection influence degree includes: constructing a gas transmission and distribution pipeline network graph, determining accessibility based on the gas transmission and distribution network graph, and determining the inspection influence degree based on the accessibility.

Figure 5:
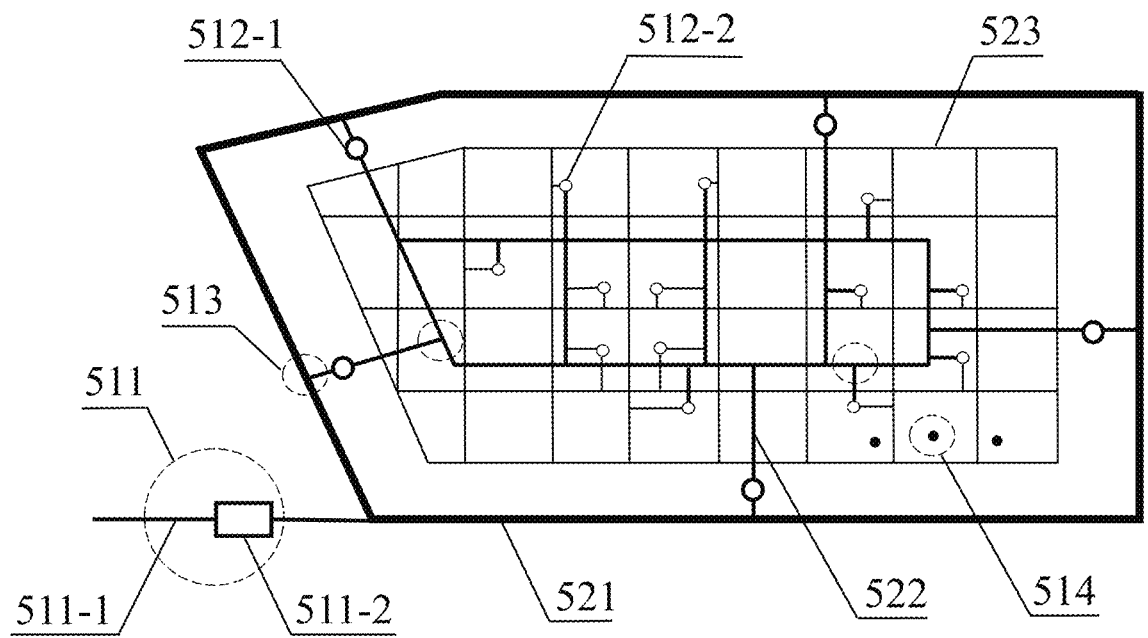
FIG. 5 is a schematic diagram illustrating an exemplary gas transmission and distribution pipeline network graph according to some embodiments of the present disclosure.

FIG. 5 is a schematic diagram illustrating an exemplary gas transmission and distribution pipeline network graph according to some embodiments of the present disclosure. The gas transmission and distribution network graph 500 may include nodes and edges.

In some embodiments, positions with specific functions and some special positions in the gas transmission and distribution network graph 500 may be abstracted as the nodes. For example, the nodes may include one or more of a gas source node 511, a pressure regulation node 512, a pipeline intersection node 513, and a user node 514.

The gas source node 511 refers to a starting point of delivering gas to the urban pipeline network. In some embodiments, the gas source node 511 may include a long-distance pipeline 511-1 and a gate station/gas distribution station 511-2.

The pressure regulation node 512 refers to a node for regulating the gas transmission and distribution pressure. In some embodiments, the pressure regulation node 512 may include at least one of a high/medium voltage regulating station 512-1 and a medium/low voltage regulating station 512-2. Features of the regulator node 512 may include a transition type of air pressure (e.g., high/medium pressure transition, medium/low pressure transition, etc.). There may be one or more pressure regulation nodes 512.

The pipeline intersection node 513 refers to a node at an intersection of three or more branches. The number of pipeline intersection nodes 513 may be one or more.

The user node 514 refers to abstracting the position of any user (such as a community, enterprise, etc.) in the pipeline network as a node. In some embodiments, a line may be drawn from any position in the gas transmission and distribution pipeline network (for example, any position in the low-pressure pipeline network) to each user node according to the actual physical position. The number of user nodes 514 may be one or more.

In some embodiments, the gas transmission and distribution pipeline may be abstracted as an edge. For example, the edges may include one or more of a high-pressure pipeline network 521, a medium-pressure pipeline network 522, and a low-pressure pipeline network 523. The edge features of an edge may include at least one of a transmission pressure (e.g., high pressure, medium pressure, low pressure, etc.) and a transmission direction.

The accessibility is used to represent whether the gas source node is capable of normally supplying gas to the user node. For more information on accessibility, please refer to step 620 and related descriptions thereof.

In some embodiments, determining the accessibility may include steps 510-530.

Step 510, regarding pipelines/nodes included in the area to be inspected involved in the gas transmission and distribution pipeline network as unavailable. For example, the nodes and edges corresponding to these pipes/nodes are temporarily hidden from the graph.

Step 520, determining, based on a graph obtained in step 510, whether the gas may be transmitted to the user node from the gas source node, wherein a traveling process needs to meet a pressure conversion condition and a directional condition.

The pressure conversion condition means that the natural gas in the high-pressure pipeline network 521 must first pass through the high/medium pressure regulation station 512-1 before entering the medium-pressure pipeline network 522, which may be regarded as meeting the pressure conversion condition; otherwise, it is regarded as not meeting the pressure conversion condition.

The directional condition refers to the direction from node A to node B must also be the same. For example, if the direction of the edge is A→B, A may reach B, but B may not reach A.

In some embodiments, the method for determining the accessibility may include a plurality of methods. For example, the plurality of methods may include exhaustive methods (if at least one route may be found, it is considered accessible), or other existing algorithms.

Step 530, if a certain user node may not be accessed, the accessibility of the user node is 0; and if a certain user node may be accessed, the accessibility may be assigned any real number between 0 and 1 according to a route condition. For example, if it may be accessed by the same route before step 510 is performed, it means that the inspection does not affect the process for accessing the user node, and the accessibility is 1. As another example, if a certain user node may be accessed, but the route is farther than the route after step 510 is performed (for example, more pipelines are detoured, a longer transmission route is taken, etc.), then the accessibility is appropriately reduced. The reduction range may be determined based on the increased transmission route, for example, the longer the increased transmission route is, the greater the reduction range may be, and the lower the accessibility may be.

The inspection influence degree refers to an influence degree of inspection on gas consumption of the gas user. The inspection influence degree is negatively correlated with the accessibility, for example, the lower the accessibility is, the greater the inspection influence degree may be.

Figure 6:
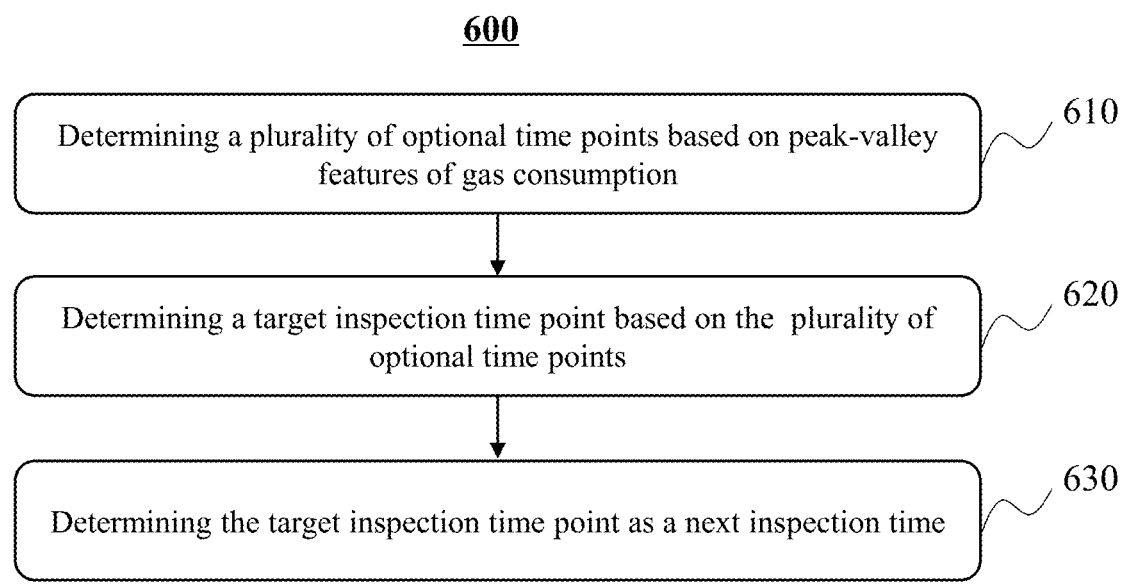
FIG. 6 is a flowchart illustrating an exemplary process for determining an inspection time of an area to be inspected according to some embodiments of the present disclosure.

FIG. 6 is a flowchart illustrating an exemplary process for determining an inspection time of an area to be inspected according to some embodiments of the present disclosure. In some embodiments, process 600 may be executed by the Internet of Things system for determining the smart gas inspection plan. As shown in FIG. 6, process 600 includes the following steps.

Step 610, determining a plurality of optional time points based on peak-valley features of gas consumption.

The optional time point refers to a time point that may be selected as the inspection time of the area to be inspected. For example, the optional time point may be 9:00 on Nov. 11, 2022.

In some embodiments, the smart gas pipeline network safety management platform may determine the optional time point in various ways. For example, the smart gas pipeline network safety management platform may take the time corresponding to the valley point in the peak-valley features where the gas consumption velocity is less than a gas consumption velocity threshold as the optional time point. The size of the gas consumption velocity threshold may be artificially set based on experience. The valley point may be a point at which the change rate of the gas consumption in the peak-valley features of gas consumption is 0, and the gas consumption velocity at an adjacent time point is greater than the gas consumption velocity. For more details about the valley point, please refer to step 230 and related descriptions thereof.

In some embodiments, the smart gas pipeline network safety management platform may determine a plurality of feature time points satisfying a first preset condition based on the peak-valley features of gas consumption; and selecting a plurality of time points satisfying a second preset condition around each of the plurality of feature time points as the plurality of optional time points, wherein a count of the plurality of optional time points is related to a valley value of a valley point corresponding to the plurality of feature time points.

The first preset condition may be determined in various ways. For example, the first preset condition may be that the valley value of the valley point in the air peak-valley features is smaller than a valley threshold. The valley threshold may be artificially set based on experience.

In some embodiments, the first preset condition may be that differences between peak values of two peak points adjacent to the valley point and the valley value of the valley point are smaller than a first threshold, and a time interval between the two peak points adjacent to the valley point is greater than the second threshold. The peak point may be a point at which the change rate of gas consumption velocity in the peak-valley features of gas consumption is 0, and the gas consumption velocity at an adjacent time point is smaller than the gas consumption velocity. For more information about the peak point, please refer to step 230 and related descriptions thereof.

Figure 7:
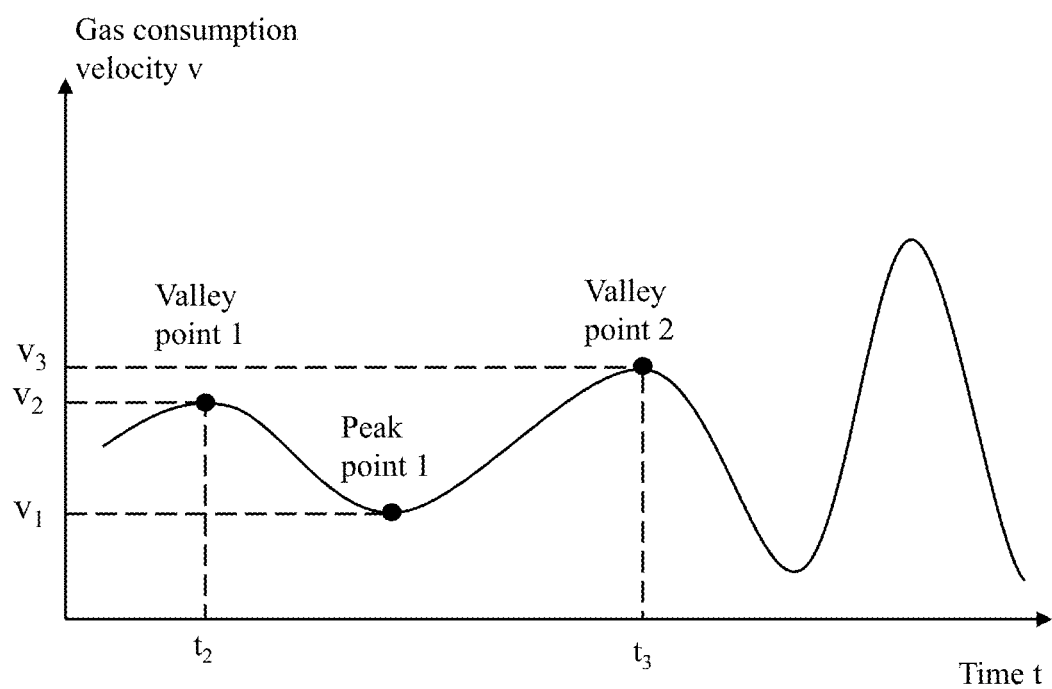
FIG. 7 is an exemplary schematic diagram representing a first preset condition according to some embodiments of the present disclosure.

As shown in FIG. 7, the first preset condition may be that the difference between the gas consumption velocity $v_1$ corresponding to valley point 1 and the gas consumption velocity $v_2$ corresponding to peak point 1, and the difference between the gas consumption velocity $v_1$ and $v_3$ corresponding to peak point 2 are both less than the first threshold, and the time interval $(t_3-t_2)$ corresponding to peak point 1 and peak point 2 is greater than the second threshold.

In some embodiments of the present disclosure, by setting the first preset condition including that the differences between the peak values of the two peak points adjacent to the valley point and the valley value of the valley point are smaller than the first threshold value, and the time interval between the two peak points adjacent to the valley point is larger than the second threshold value, the obtained feature time points have low gas consumption velocities in the adjacent time period, which can effectively reduce the gas consumption influence on downstream users when used as the inspection time.

The feature time point refers to a time point corresponding to the feature point satisfying the first preset condition. For example, the feature time point may be a time point corresponding to a valley point satisfying the first preset condition.

The second preset condition may be determined in various ways. For example, the second preset condition may be a time point separated by n preset time periods from the feature time point, and its corresponding gas consumption velocity is less than the velocity threshold. n may be an integer; the length of the preset time period and the size of the velocity threshold may be set in advance according to experience.

Figure 8:
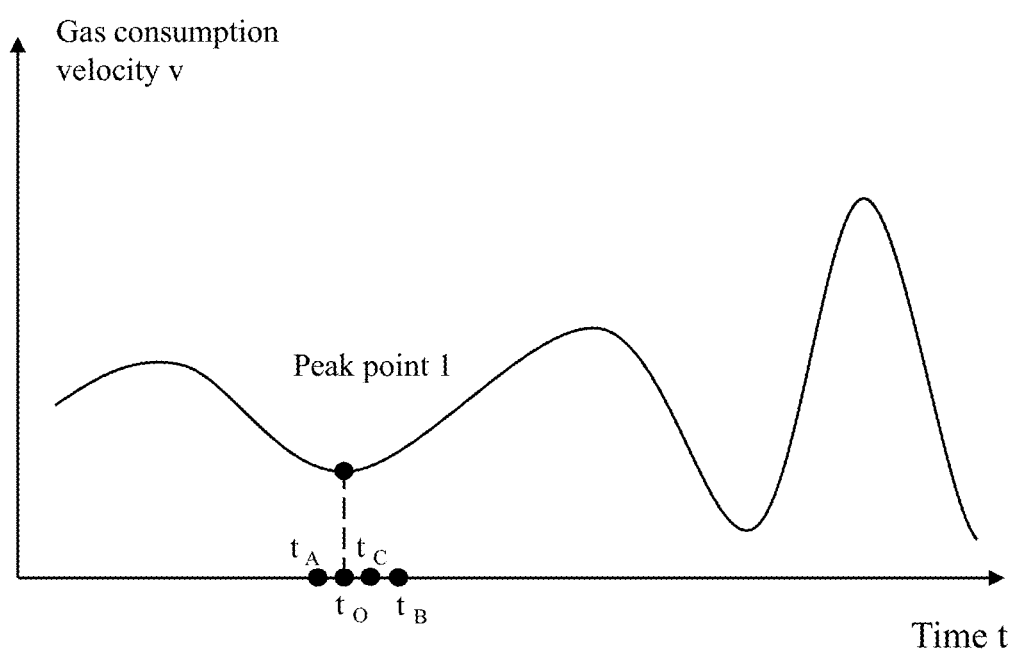
FIG. 8 is an exemplary schematic diagram representing a second preset condition according to some embodiments of the present disclosure.

As shown in FIG. 8, the time point to corresponding to the valley point 2 is a feature time point, and the second preset condition may be a time point that is away from the feature time point $t_O$ by an integer of a plurality of lengths of the time period $t_i$, and the corresponding gas consumption velocity is less than the second threshold. There is a plurality of optional time points $t_A$, $t_B$, and $t_C$ that satisfies the second preset condition in FIG. 8.

In some embodiments, the number of the plurality of optional time points is positively related to the valley value of the valley point corresponding to the plurality of feature time points. For example, the lower the valley value of the valley point corresponding to the feature time point is, the larger the number of optional time points corresponding to the feature time point may be.

The first threshold and the second threshold may be determined in various ways. For example, the first threshold and the second threshold may be set in advance, artificially set based on experience, default values, or the like, or any combination thereof.

In some embodiments, different valley points have different first and second thresholds. The first thresholds and the second thresholds are related to a dispersion degree of peak-valley sub-features of gas consumption.

The dispersion degree of the peak-valley features of gas consumption refers to the degree of difference between the two peak points adjacent to the valley point relative to the valley point. The dispersion degree of the peak-valley features of gas consumption may be determined by calculating the variance of the valley point and the two peak points adjacent to the valley point. For example, as shown in FIG. 7, the valley value of valley point 1 is $v_1$, and the peak values of the two peak points 1 and 2 adjacent to valley point 1 are $v_2$ and $v_3$, respectively, so the dispersion degree of the gas peak-valley features may be calculated by the formula $$s^2 = \frac{1}{3}\left[(v_1 - v_0)^2 + (v_2 - v_0)^2 + (v_3 - v_0)^2\right].$$

s is the dispersion degree of the peak-valley features of gas consumption; and $v_0$ is the average of $v_1$, $v_2$ and $v_3$.

In some embodiments, the first threshold is inversely related to the dispersion degree of peak-valley features of gas consumption; the second threshold is positively related to the dispersion degree of peak-valley features of gas consumption. For example, when the dispersion degree of the peak-valley feature of gas consumption is greater than the dispersion threshold, the first threshold and the second threshold may be increased. The size of the dispersion threshold may be artificially set based on experience.

In some embodiments of the present disclosure, different first thresholds and second thresholds for different valley points are set, and the first thresholds and second thresholds are related to the dispersion degree of the gas peak-valley features, when the dispersion degree is high, it means that the gas consumption velocity of each downstream user is quite different, and the gas consumption velocity in this time period is unstable. Reducing the first threshold and increasing the second threshold is beneficial to select the feature time point in the time period when the gas consumption velocity is stable, so that the finally determined inspection time has less impact on the gas consumption of downstream users.

Step 620, determining a target inspection time point based on the plurality of optional time points.

The target inspection time point refers to a time point that is more suitable to be selected as the inspection time of the area to be inspected. For example, the target inspection time point may be 9:00 on Nov. 11, 2022.

In some embodiments, the smart gas pipeline network safety management platform may determine the target inspection time point in various ways. For example, the smart gas pipeline network safety management platform may determine the target inspection time point based on the length of the time period between the optional time point and the current time point and the gas consumption velocity corresponding to the optional time point. When the length of the time period between the optional time point and the current time point is less than the time period threshold, and the gas consumption velocity corresponding to the optional time point is lower than the velocity threshold, the smart gas pipeline network safety management platform may use the optional time point as the target inspection time point. The length of the time period threshold and the size of the velocity threshold may be artificially set according to experience.

In some embodiments, the smart gas pipeline network safety management platform may obtain the gas consumption data of the each of the one or more downstream users before the plurality of optional time points; predict future gas consumption features by processing the gas consumption data of the each of the one or more downstream users before the plurality of optional time points through a prediction model; and determine the target inspection time point based on the future gas consumption features.

For more information on obtaining the gas consumption data, please refer to step 220 and related descriptions thereof.

The future gas consumption features refer to a gas consumption velocity at each time in a future time period after the optional time point is used as the inspection time point for inspection. For example, the optional time point is 9:00 on Nov. 11, 2022, and the future gas consumption feature may be a predicted gas consumption velocity of each time in the next day after the inspection and taking this optional time point as the inspection time point.

The prediction model may be a machine learning model for predicting future gas consumption features. For example, the prediction model may include one of a Neural Network (NN) model, a Convolutional Neural Network (CNN) model, or the like, or any combination thereof.

In some embodiments, an input of the prediction model may include the gas consumption data of the each of the one or more downstream users before the optional time point and the optional time point. An output of the prediction model may include future gas consumption features.

In some embodiments, the input of the prediction model further includes one or more accessibility change values.

Accessibility refers to whether the gas is capable of being normally supplied and transported to downstream users. The accessibility may be represented by 0 and 1. The accessibility of 0 means that the gas may not be normally supplied and transported to downstream users; and the accessibility of 1 means that the gas may be normally supplied and transported to downstream users.

In some embodiments of the present disclosure, by using one or more accessibility change values as the input of the prediction model, the change of the gas supply and transportation situation of the downstream user during the inspection is taken into account, so that the reliability of the output future gas consumption features is higher, the determined target inspection time point has less influence on the gas consumption of downstream users.

In some embodiments, the prediction model may be obtained by training a plurality of second training samples with second labels. For example, the plurality of second training data with the second labels may be input into an initial prediction model, a loss function is constructed through the second labels and the result of the initial prediction model, and parameters of the initial prediction model are iteratively updated based on the loss function. When the loss function of the initial prediction model satisfies a preset condition, the model training is completed and a trained prediction model is obtained. The preset condition may be that the loss function converges, the count of iterations reaches a threshold, or the like.

In some embodiments, the second training sample of the prediction model may include historical gas consumption data of the each of the one or more downstream users before a plurality of historical inspection time points; and the second label may be historical gas consumption features. The second training sample and the second label may be obtained based on statistical data from a gas gate station.

In some embodiments, the smart gas pipeline network safety management platform may determine the target gas inspection time point in various ways. For example, the smart gas pipeline network safety management platform may take an optional time point whose gas consumption velocity is less than a velocity threshold in the future gas consumption features as the target inspection time point. The velocity threshold may be artificially set based on experience.

In some embodiments of the present disclosure, the prediction model is used to process the gas consumption data of the each of the one or more downstream users before a plurality of optional time points to obtain the future gas consumption features, so as to determine the target inspection time point, which not only improves the efficiency of determining the target inspection point, but also improves the reliability and accuracy of the determination process.

Step 630, determining the target inspection time point as a next inspection time.

In some embodiments, the smart gas pipeline network safety management platform may determine the inspection time in various ways. For example, the smart gas pipeline network safety management platform may directly use the target inspection time as the inspection time. As another example, the smart gas pipeline network safety management platform may artificially adjust the target inspection time according to experience and use the adjusted target inspection time as the inspection time.

In some embodiments of the present disclosure, the plurality of optional time points are determined by using the gas peak-valley features, and the target inspection time point is determined based on the optional time points, and finally the inspection time is obtained, which makes the entire determination process more reliable and helps reduce influence on gas consumption of downstream users during inspections.

One or more embodiments of the present disclosure provide a device for determining a smart gas inspection plan, including a processor, and the processor is configured to execute a method for determining a smart gas inspection plan.

One or more embodiments of the present disclosure also provide a non-transitory computer-readable storage medium, the storage medium stores computer instructions, and after reading the computer instructions in the storage medium, a computer executes the method for determining a smart gas inspection plan as described in any of the above embodiments.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for gas pipeline network supervision based on smart gas, wherein the method is implemented based on a smart gas pipeline network safety management platform of an Internet of Things (IoT) system for gas pipeline network supervision based on smart gas, the IoT system further includes a smart gas user platform, a smart gas service platform, a smart gas sensor network platform, and a smart gas object platform, wherein the smart gas pipeline network safety management platform includes a smart gas pipeline network inspection management sub-platform and a smart gas data center, the smart gas sensor network platform includes a smart gas pipeline network inspection project sensor network sub-platform, the smart gas object platform includes one or more smart gas pipeline network inspection project object sub-platforms, wherein the smart gas user platform includes a terminal device;
the smart gas object platform includes a gas device and an inspection project device, the gas device includes a pipeline network device, the pipeline network device includes pipelines and gate stations, and the inspection project device includes inspection vehicles and alarm devices;

and the method comprises:
obtaining an area to be inspected through the smart gas data center;
determining one or more downstream users based on the area to be inspected, and obtaining gas consumption data of each of the one or more downstream users through the smart gas sensor network platform;
determining, based on the gas consumption data of the one or more downstream users, peak-valley features of gas consumption at a future time;
determining a plurality of optional time points based on the peak-valley features of gas consumption;
predicting future gas consumption features based on one or more change values of accessibility, the plurality of optional time points, and the gas consumption data of the one or more downstream users through a prediction model, wherein:
the future gas consumption features are gas consumption features after inspection based on each of the plurality of optional time points; and
the accessibility is used to represent whether a gas source node is capable of normally supplying gas to a user node;
the prediction model is a machine learning model, wherein the prediction model is obtained by a training process based on a plurality of training samples with labels, the training process including:
inputting the plurality of the training samples into an initial prediction model;
constructing a loss function based on the labels and results of the initial prediction model;
updating parameters of the initial prediction model iteratively based on the loss function; and
obtaining a trained prediction model when a preset training condition of the initial prediction model is satisfied, wherein the preset training condition includes that the loss function converges or a count of iterations reaches a threshold; and
the training samples including historical gas consumption data of the each of the one or more downstream users before a plurality of historical inspection time points; and the labels being historical gas consumption features after inspection based on the plurality of historical inspection time points;

determining a target inspection time point based on the future gas consumption features;

automatically arranging an unexecuted inspection plan according to the target inspection time;

sending a prompt and an alarm according to a preset threshold to the smart gas user platform for controlling the terminal device to feed information back to a user;

generating inspection reminder instructions based on the target inspection time point through an inspection time warning module of the smart gas pipeline network inspection management sub-platform, wherein the inspection reminder instructions are sent to a corresponding smart gas pipeline network inspection project object sub-platform by the smart gas data center through the smart gas pipeline network inspection project sensor network sub-platform of the smart gas sensor network platform; and controlling the pipelines, the gate stations, and the inspection vehicles, by a computer, deployed in different areas of pipeline network to execute the inspection reminder instructions.

2. The method according to claim 1, wherein the determining, based on the gas consumption data of the one or more downstream users, peak-valley features of gas consumption at a future time includes:

predicting future gas consumption data at a plurality of future times based on the gas consumption data of the one or more downstream users; and determining the peak-valley features of gas consumption at the future time based on the future gas consumption data at the plurality of future times.

3. The method according to claim 2, wherein the predicting future gas consumption data at a plurality of future times based on the gas consumption data of the one or more downstream users includes:

independently predicting the future gas consumption data at the plurality of future times of the one or more downstream users based on the gas consumption data of the one or more downstream users; and the determining the peak-valley features of gas consumption at the future time based on the future gas consumption data at the plurality of future times includes:

independently determining a plurality of peak-valley sub-features of gas consumption of the one or more downstream users at the future time based on the future gas consumption data at the plurality of future times of the one or more downstream users; and determining the peak-valley features of gas consumption based on the plurality of peak-valley sub-features of gas consumption.

4. The method according to claim 3, wherein the determining the peak-valley features of gas consumption based on the plurality of peak-valley sub-features of gas consumption includes:

determining the peak-valley features of gas consumption based on a weighted calculation of the plurality of peak-valley sub-features of gas consumption; wherein a weight of the weighted calculation is determined based on an inspection influence degree, and a process for determining the inspection influence degree includes:

constructing a gas transmission and distribution network graph, wherein the gas transmission and distribution network graph includes nodes and edges, the nodes include at least one of a gas source node, a pressure regulation node, a pipeline intersection node, and a user node, and the edges include pipelines;

determining the accessibility based on the gas transmission and distribution network graph; and determining the inspection influence degree based on the accessibility, wherein the inspection influence degree is negatively correlated with the accessibility.

5. The method according to claim 1, wherein the determining a plurality of optional time points based on the peak-valley features of gas consumption includes:

determining a plurality of feature time points satisfying a first preset condition based on the peak-valley features of gas consumption; and selecting a plurality of time points satisfying a second preset condition from each of the plurality of feature time points and time points near the plurality of feature time points as the plurality of optional time points, wherein a count of the plurality of optional time points is related to a valley value of a valley point corresponding to the plurality of feature time points.

6. The method according to claim 5, wherein the first preset condition includes: differences between peak values of two peak points adjacent to the valley point and the valley value being smaller than a first threshold, and a time interval between the two peak points adjacent to the valley point being larger than a second threshold.

7. The method according to claim 6, wherein different valley points have different first thresholds and second thresholds, and the first thresholds and the second thresholds are related to a dispersion degree of a plurality of peak-valley sub-features of gas consumption.

8. A non-transitory computer-readable storage medium storing computer instructions, wherein after reading the computer instructions in the storage medium, a computer executes the method for gas pipeline network supervision based on smart gas according to claim 1.

9. The method of claim 1, further comprising:

generating instructions for obtaining inspection problems based on the target inspection time point; and sending the instructions for obtaining the inspection problems to the corresponding smart gas pipeline network inspection project object sub-platform by the smart gas data center through the smart gas pipeline network inspection project sensor network sub-platform of the smart gas sensor network platform to control at least one of the gas device or the inspection project device to obtain the inspection problems.

\* \* \* \* \*